United States Patent
Iwabuchi

(10) Patent No.: US 11,586,174 B2
(45) Date of Patent: Feb. 21, 2023

(54) CONTROLLER, STORAGE MEDIUM, AND WIRELESS COMMUNICATION DEVICE

(71) Applicant: FANUC CORPORATION, Yamanashi (JP)

(72) Inventor: Shingo Iwabuchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 149 days.

(21) Appl. No.: 16/743,545

(22) Filed: Jan. 15, 2020

(65) Prior Publication Data

US 2020/0264587 A1   Aug. 20, 2020

(30) Foreign Application Priority Data

Feb. 18, 2019   (JP) .............................. JP2019-026768

(51) Int. Cl.
*G05B 19/4155*   (2006.01)

(52) U.S. Cl.
CPC .................... *G05B 19/4155* (2013.01); *G05B 2219/32043* (2013.01); *G05B 2219/33192* (2013.01)

(58) Field of Classification Search
CPC ...... G05B 19/4155; G05B 2219/33192; G05B 2219/32043; G05B 19/4185; G05B 2219/33139; H04W 4/50; H04L 67/125
See application file for complete search history.

(56) References Cited

U.S. PATENT DOCUMENTS

| 9,571,986 | B2 * | 2/2017 | Gottschalk | .............. H04W 4/33 |
| 10,624,114 | B2 * | 4/2020 | Abdel Shahid | ....... H04W 72/14 |
| 11,042,147 | B2 * | 6/2021 | Tugbo | ................ G05B 19/4155 |
| 2014/0098247 | A1 * | 4/2014 | Rao | ......................... H04W 4/20 |
| | | | | 348/207.1 |

(Continued)

FOREIGN PATENT DOCUMENTS

| JP | 2004-282119 | 10/2004 |
| JP | 2007-201917 | 8/2007 |

(Continued)

OTHER PUBLICATIONS

Office Action dated Jun. 8, 2021 in corresponding Japanese Patent Application No. 2019-026768.

*Primary Examiner* — Charles R Kasenge
(74) *Attorney, Agent, or Firm* — Wenderoth, Lind & Ponack, L.L.P.

(57) ABSTRACT

The present invention has an object of providing a controller, a program, and a wireless communication device that can perform update or a setting operation of software more easily. A controller includes: a control program storage unit that stores a control program for controlling an operation of an industrial machine; a detection unit that detects a wireless communication device connected to a connection terminal; a control program acquiring unit that acquires a control program for storing in the control program storage unit via the wireless communication device; a storage executing unit that executes storing of an acquired control program in the control program storage unit; and an operation changing unit that allows the control program acquiring unit and the storage executing unit to be operated on a basis of detection of the wireless communication device.

10 Claims, 3 Drawing Sheets

(56) References Cited

U.S. PATENT DOCUMENTS

| | | | | |
|---|---|---|---|---|
| 2014/0255036 | A1* | 9/2014 | Jovicic | G07C 9/00571 |
| | | | | 398/115 |
| 2015/0327010 | A1* | 11/2015 | Gottschalk | H04W 4/021 |
| | | | | 455/456.1 |
| 2016/0034237 | A1* | 2/2016 | Kojima | G06F 3/1292 |
| | | | | 358/1.15 |
| 2016/0212147 | A1* | 7/2016 | Palin | H04L 63/062 |
| 2016/0212194 | A1* | 7/2016 | Palin | G06F 3/0484 |
| 2017/0176964 | A1* | 6/2017 | O'Keeffe | G06N 20/00 |
| 2017/0182664 | A1* | 6/2017 | Watts | H04L 67/10 |
| 2017/0237870 | A1* | 8/2017 | Kojima | G06F 3/1292 |
| | | | | 358/1.15 |
| 2017/0372600 | A1* | 12/2017 | Palin | H04M 1/72412 |
| 2018/0229363 | A1* | 8/2018 | Kurihara | B25J 9/161 |
| 2019/0188992 | A1* | 6/2019 | Bodurka | A61G 12/00 |
| 2020/0066072 | A1* | 2/2020 | Galvez | G07C 9/00309 |
| 2020/0196122 | A1* | 6/2020 | Junk | H04L 9/3013 |
| 2020/0225643 | A1* | 7/2020 | Tugbo | G05B 19/4183 |
| 2020/0225649 | A1* | 7/2020 | Cahill | H04L 9/3247 |
| 2020/0226123 | A1* | 7/2020 | Nixon | H04L 9/0643 |
| 2020/0228316 | A1* | 7/2020 | Cahill | H04L 9/0637 |
| 2020/0228342 | A1* | 7/2020 | Nixon | G06F 21/64 |

FOREIGN PATENT DOCUMENTS

| | | |
|---|---|---|
| JP | 2010-204843 | 9/2010 |
| JP | 2016-143318 | 8/2016 |
| WO | 2018/123241 | 7/2018 |

* cited by examiner

CONTROLLER, STORAGE MEDIUM, AND WIRELESS COMMUNICATION DEVICE

This application is based on and claims the benefit of priority from Japanese Patent Application No. 2019-026768, filed on 18 Feb. 2019, the content of which is incorporated herein by reference.

BACKGROUND OF THE INVENTION

Field of the Invention

The present invention relates to a controller, a storage medium, and a wireless communication device.

Related Art

Conventionally, industrial machines including industrial robots and machine tools, etc., operate based on signals from a controller such as CNC (computerized numerical control). The controller is, for example, incorporated into an industrial machine, and supplied along with the industrial machine. Furthermore, control programs set in the controller are pre-installed during manufacturing of the industrial machine and supplied along with the industrial machine.

The control program set in the controller is preferably updated to a program more suitable for the request of the shipping destination, the installation environment, etc., or alternatively set from the beginning. In contrast, when the control program is provided by a storage medium such as a memory card, it takes effort to transport and connect the storage medium containing the control program to the CNC. Therefore, a method of updating software through the network has been proposed (e.g., refer to Japanese Unexamined Patent Application, Publication No. 2004-282119).

Patent Document 1: Japanese Unexamined Patent Application, Publication No. 2004-282119

SUMMARY OF THE INVENTION

As described in Japanese Unexamined Patent Application, Publication No. 2004-282119, it is more preferable if it is possible to update or set the control program via the network. On the other hand, when connecting each of a plurality of controllers to the network by wires, wiring operations occur. Therefore, it is necessary to consider the increase of the work quantity. Therefore, it is more preferable if updating or setting operation of the control program can be performed more easily.

(1) A first aspect of the present disclosure relates to a controller that includes a connection terminal which can be connected to a wireless communication device, and controls an industrial machine, the controller including: a control program storage unit that stores a control program for controlling an operation of the industrial machine; a detection unit that detects the wireless communication device connected to the connection terminal; a control program acquiring unit that acquires a control program for storing in the control program storage unit via the wireless communication device; a storage executing unit that executes storing of an acquired control program in the control program storage unit; and an operation changing unit that changes the control program acquiring unit and the storage executing unit to be operable on a basis of detection of the wireless communication device.

(2) Another aspect of the present disclosure relates to a non-transitory computer-readable storage medium encoded with a computer-readable program that causes a computer including a connection terminal that can be connected to a wireless communication device to operate as a controller which controls an industrial machine, the program causing the computer to operate as: a control program storage unit that stores a control program for controlling an operation of the industrial machine; a detection unit that detects the wireless communication device connected to the connection terminal; a control program acquiring unit that acquires a control program for storing in the control program storage unit via the wireless communication device; a storage executing unit that executes storing of an acquired control program in the control program storage unit; and an operation changing unit that changes the control program acquiring unit and the storage executing unit to be operable on a basis of a detection of the wireless communication device.

(3) Yet another aspect of the present disclosure relates to a wireless communication device that stores the program according to (2) above.

According to one aspect, it is possible to update or perform setting operation of software more easily.

DETAILED DESCRIPTION OF THE INVENTION

Figure 1:
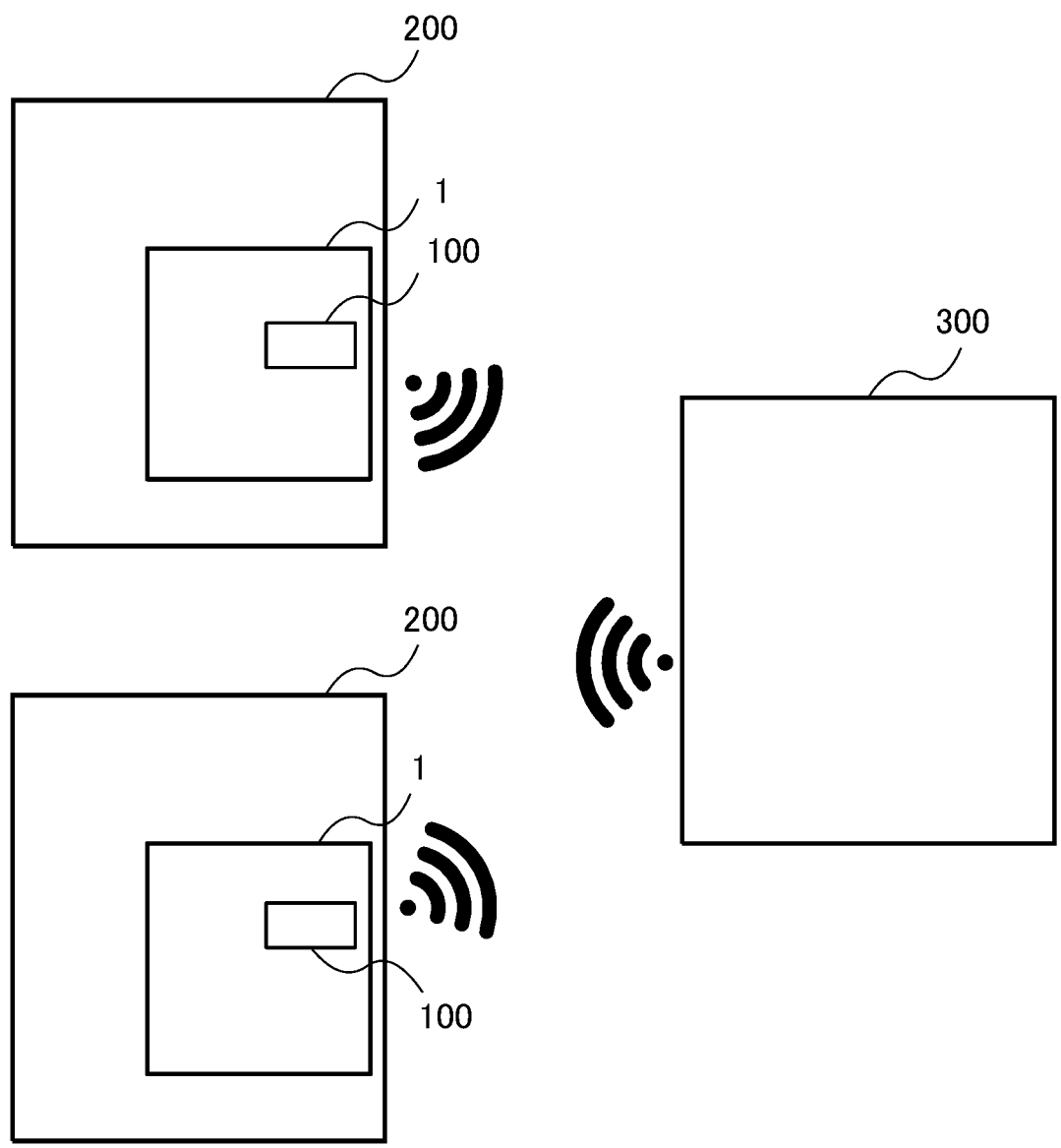
FIG. 1 is a schematic diagram showing an outline of an installation status of a controller and a wireless communication device according to an embodiment.

Hereinafter, a controller 1, a storage medium, and a wireless communication device 100 according to an embodiment of the present disclosure will be described with reference to FIGS. 1 to 3. First, a description will be given of an overall summary including the controller 1 and the wireless communication device 100. The controller 1 is a device for controlling the operation of an industrial machine 200 including industrial robots and machine tools. The controller 1 is configured to be integrally paired with, for example, the industrial machine 200. That is, each of the plurality of controllers 1 is integrally configured to be paired with the plurality of industrial machines 200 at the manufacturing site of the industrial machines 200. The wireless communication device 100 enabling wireless communication is attached to each of the controllers 1. The wireless communication device 100 is wirelessly and communicatively connected to the server 300 that stores the program and the like of the controller 1. That is, each of the plurality of controllers 1 is wirelessly connected with the servers 300. Thus, it is possible for each of the controllers 1 to acquire a control program or the like for controlling the industrial machine 200 from the server 300 via the wireless communication device 100, and it is also possible for each of the controllers 1 to wirelessly transmit collected data (history information) relating to the industrial machine 200 to the server 300.

Figure 2:
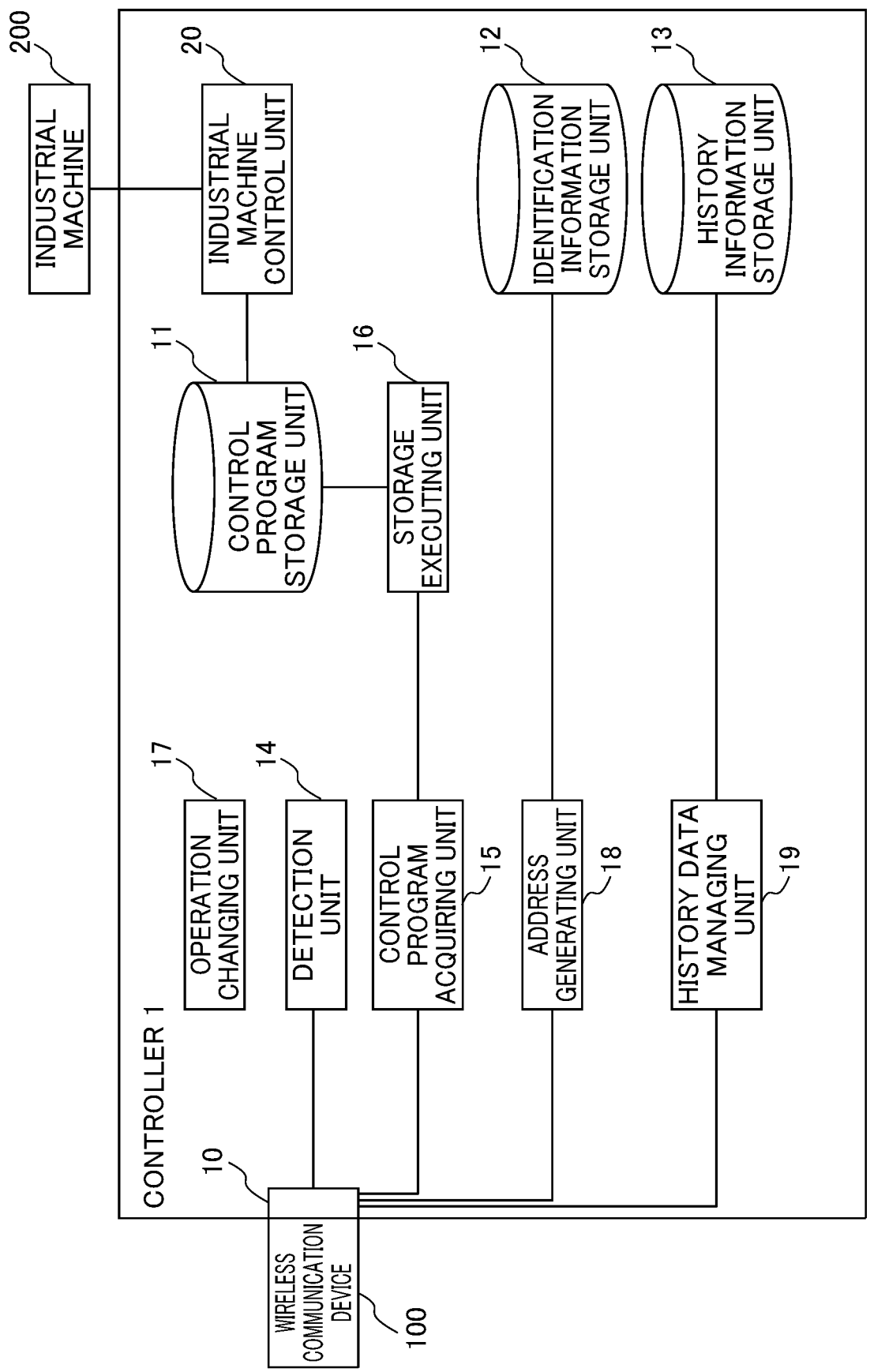
FIG. 2 shows a block diagram of a controller according to an embodiment.
Figure 3:
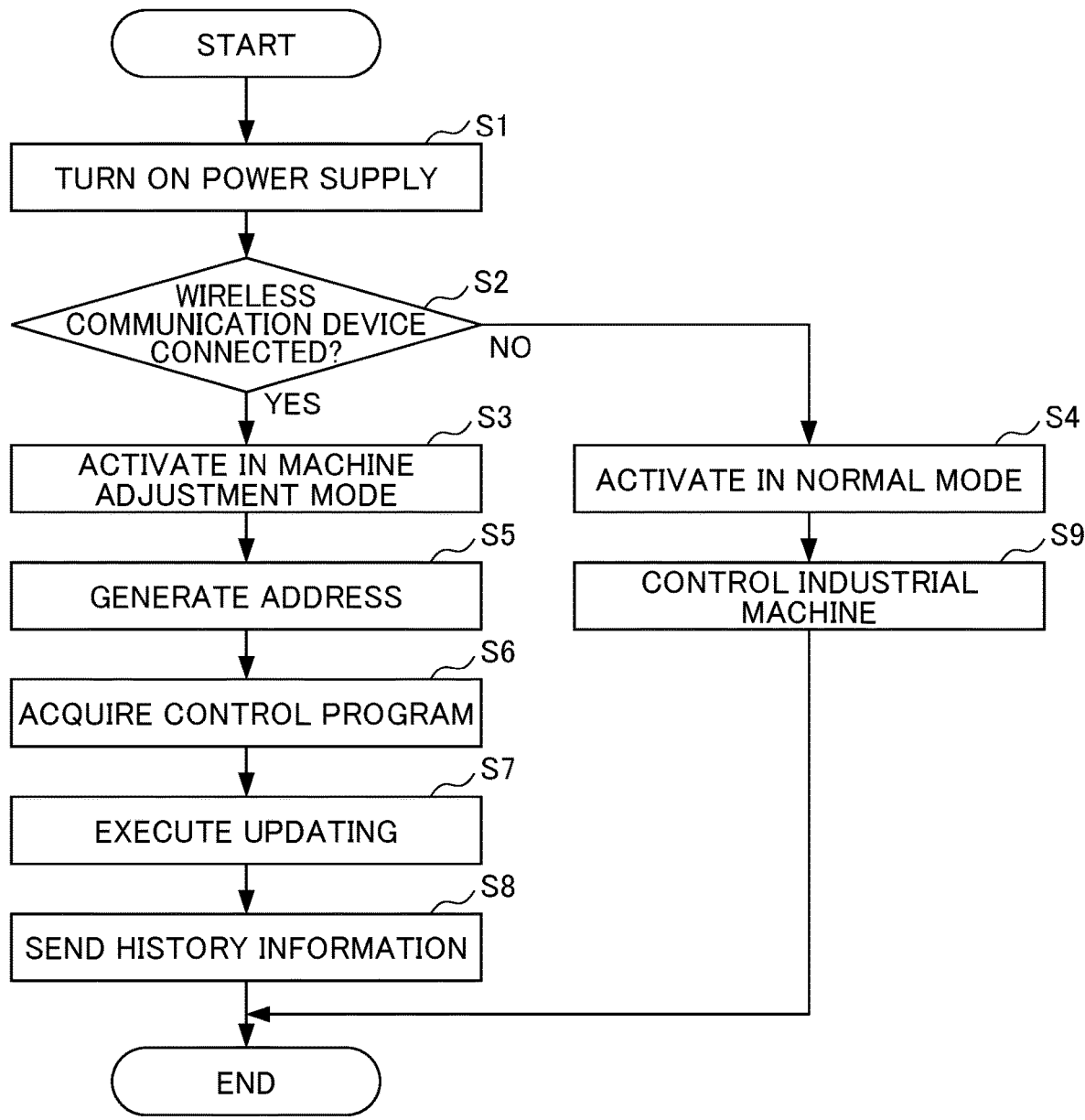
FIG. 3 is a flowchart showing a flow of processing by a controller according to an embodiment.

Such a controller 1, as shown in FIG. 2, has a connection terminal 10 that can be connected to the wireless communication device 100. Furthermore, the controller 1 includes a control program storage unit 11, an identification information storage unit 12, a history information storage unit 13, a detection unit 14, a control program acquiring unit 15, a storage executing unit 16, an operation changing unit 17, an address generating unit 18, a history information managing unit 19, and an industrial machine control unit 20.

The connection terminal 10 is, for example, a card reader, a terminal capable of connecting an external terminal of USB (Universal Serial Bus) or the like. In the present embodiment, the connection terminal 10 is configured to be connectable to the wireless communication device 100.

The control program storage unit 11 is, for example, a storage medium such as memory or a hard disk. The control program storage unit 11 stores a control program for controlling the operation of the industrial machine 200. The control program storage unit 11, for example, stores, as control programs, a program for executing control of the industrial machine 200 based on a numerical value inputted by an input unit (not shown), a program for setting the operation of industrial equipment, etc.

The identification information storage unit 12 is, for example, a storage medium such as memory or a hard disk. The identification information storage unit 12 stores identification information unique to a device. That is, the identification information storage unit 12 possesses in advance identification information which is different from the identification information of another controller 1.

The history information storage unit 13 is, for example, a storage medium such as memory or a hard disk. The history information storage unit 13 stores, as history information, operation history (logs) such as a manipulation history using an input unit (not shown) such as a keyboard, transmission and reception contents of the communication between the controller 1 and the industrial machine 200, etc.

The detection unit 14 is realized by the operation of the CPU. The detection unit 14 detects the wireless communication device 100 connected to the connection terminal 10. The detection unit 14 confirms the presence or absence of a connection of the wireless communication device 100 to the connection terminal 10, for example, by receiving a signal from the wireless communication device 100.

The control program acquiring unit 15 is, for example, realized by the operation of the CPU. The control program acquiring unit 15 acquires a control program for storing in the control program storage unit 11 via the wireless communication device 100. In the present embodiment, the control program acquiring unit 15 acquires a control program for updating the control program already stored in the control program storage unit 11.

The storage executing unit 16 is, for example, realized by the operation of the CPU. The storage executing unit 16 updates the control program stored in the control program storage unit 11 with an acquired control program.

The operation changing unit 17 is, for example, realized by the operation of the CPU. The operation changing unit 17 operatively changes the acquisition of a control program and the storage executing unit 16, based on the detection of the wireless communication device 100. That is, when the wireless communication device 100 is connected to the connection terminal 10, the operation changing unit 17 controls so as to operate the control program acquiring unit 15 and the storage executing unit 16. In other words, in a case in which the wireless communication device 100 has not been detected by the detection unit 14, the operation changing unit 17 configures so as not to allow the control program acquiring unit 15 and the storage executing unit 16 operate. Furthermore, the operation changing unit 17 controls to operate the address generating unit 18 and the history information managing unit 19 (described later) based on the detection of the wireless communication device 100.

The address generating unit 18 is, for example, realized by the operation of the CPU. The address generating unit 18 generates a network address to be set in the wireless communication device 100 based on identification information. In the present embodiment, the address generating unit 18, for example, generates a hash value of the identification information by using a hash function. Specifically, for the identification information, the address generating unit 18 converts into a number that can be used as a network address (IP address) using a hash function. For the identification information, the address generating unit 18 converts into a numerical value of six digits that can be set to the third and four octets of the network address (IP address). Thus, the address generating unit 18 generates a unique IP address for each controller 1.

The history information managing unit 19 is, for example, realized by the operation of the CPU. The history information managing unit 19 acquires the history information (log) stored in the history information storage unit 13. The history information managing unit 19 transmits acquired history information to the server 300 via the wireless communication device 100.

The industrial machine control unit 20 is, for example, realized by the operation of the CPU. The industrial machine control unit 20 sends a signal for controlling the industrial machine 200 to the industrial machine 200 based on the control program stored in the control program storage unit 11.

Next, a description will be given of the wireless communication device 100. The wireless communication device 100 is, for example, an external device that can be connected to the connection terminal 10 of the controller 1. The wireless communication device 100 is connected to the connection terminal 10, thereby providing a wireless communication environment to the controller 1. That is, the wireless communication device 100 is connected to the connection terminal 10, thereby functioning as a wireless communication terminal of the controller 1. Furthermore, in the present embodiment, the wireless communication device 100 functions as a storage medium. The wireless communication device 100 stores a program that operates the controller 1 as the detection unit 14, the control program acquiring unit 15, the address generating unit 18, the storage executing unit 16, the operation changing unit 17, and the history information managing unit 19. For example, the wireless communication device 100 is connected to the connection terminal 10 of the controller 1, thereby storing a program for starting a machine adjustment mode for operating the controller 1 as the detection unit 14, the control program acquiring unit 15, the address generating unit 18, the storage executing unit 16, the operation changing unit 17, and the history information managing unit 19.

Next, the operation of the controller 1 will be described with reference to the flowchart of FIG. 3. First, power supply is turned on for each of a plurality of controllers 1 (Step S1). Thereafter, whether or not the wireless communication device 100 is connected to the connection terminal 10 is determined (Step S2). In a case in which the wireless communication device 100 is connected to the connection terminal 10, the processing advances to Step S3 (Step S2: YES). On the other hand, in a case in which the wireless communication device 100 is not connected to the connection terminal 10, the processing advances to Step S4 (Step S2: NO).

In Step S3, the controller 1 is activated in the machine adjustment mode. Specifically, the detection unit 14 detects the connection of the wireless communication device 100 to the connection terminal 10. The detection unit 14 notifies the operation changing unit 17 of the detection of the wireless communication device 100. The operation changing unit 17 causes the control program acquiring unit 15 and the address generating unit 18 to operate. Furthermore, the operation changing unit 17 causes the history information managing unit 19 to operate.

Thereafter, the operation changing unit 17 causes the address generating unit 18 to generate a network address from the identification information (Step S5). The address generating unit 18 reads the identification information from the identification information storage unit 12, and generates a network address. The address generating unit 18 sets the generated network address in the wireless communication device 100.

Thereafter, the control program acquiring unit 15 acquires a control program from the server 300 (Step S6). The control program acquiring unit 15 sends the acquired control program to the storage executing unit 16. The storage executing unit 16 updates the control program stored in the control program storage unit 11 with the acquired control program (Step S7). The storage executing unit 16 stores the updated history as the history information in the history information storage unit 13. Furthermore, the storage executing unit 16 stores, as the history information, for example, the fact that the control program has been manually changed, in the history information storage unit 13.

Thereafter, the history information managing unit 19 transmits the history information to the server 300 (Step S8). Specifically, the history information managing unit 19 acquires the history information by reading the history information stored in the history information storage unit 13. The history information managing unit 19 transmits the history information thus read to the server 300. Furthermore, the history information managing unit 19 deletes the history information stored in the history information storage unit 13. Thus, the processing according to the present flow ends.

On the other hand, in Step S4 (Step S2: NO), the controller 1 is activated in the normal operation mode. In the normal operation mode, the industrial machine control unit 20 controls the operation of the industrial machine 200 by the control program stored in the control program storage unit 11 (Step S9). Thereafter, the control of the industrial machine 200 ends, and the processing according to the present flow ends.

The controller 1, the program, and the wireless communication device 100 according to the above embodiment exert the following effects.

(1) The controller 1 includes: the control program storage unit 11 that stores a control program for controlling an operation of the industrial machine 200; the detection unit 14 that detects the wireless communication device 100 connected to the connection terminal 10; the control program acquiring unit 15 that acquires a control program for storing in the control program storage unit 11 via the wireless communication device 100; the storage executing unit 16 that executes storing of an acquired control program in the control program storage unit 11; and the operation changing unit 17 that allows the control program acquiring unit 15 and the storage executing unit 16 to be operated on a basis of detection of the wireless communication device 100. Thus, a temporary network environment can be constructed in the controller 1. The program can be updated or stored more easily than a case in which a storage medium on which a different program is stored for each controller 1 is brought up to controller 1, and the program is updated or newly stored. Furthermore, as compared with a case of connecting each controller 1 to the server 300 by wire, it is possible to update or store the program more easily.

(2) The controller 1 further includes the identification information storage unit 12 that stores identification information unique to a device, and the address generating unit 18 that generates a network address set to the wireless communication device 100, and the control program acquiring unit 15 acquires a control program externally by using a generated network address. Thus, it is possible to eliminate the labor for setting a network address for each of the plurality of controllers 1. Therefore, it is possible to achieve a reduction in the amount of work.

(3) The address generating unit 18 calculates a hash value unique to a device as identification information, and generates a network address by using a calculated hash value. Thus, since it is possible to specifically generate a unique network address from the identification information, it is possible to suppress the overlap of the network address.

(4) A non-transitory computer-readable storage medium encoded with a computer-readable program that causes a computer including a connection terminal 10 that can be connected to a wireless communication device 100 to operate as a controller 1 which controls an industrial machine 200, the program causing the computer to operate as: a control program storage unit 11 that stores a control program for controlling an operation of the industrial machine 200; a detection unit 14 that detects the wireless communication device 100 connected to the connection terminal 10; a control program acquiring unit 15 that acquires a control program for storing in the control program storage unit 11 via the wireless communication device 100; a storage executing unit 16 that executes storing of an acquired control program in the control program storage unit 11; and an operation changing unit 17 that changes the control program acquiring unit 15 and the storage executing unit 16 to be operable on a basis of a detection of the wireless communication device 100. Furthermore, the wireless communication device 100 stores a program that causes a computer to operate as the controller 1 controlling the industrial machine 200. Thus, the control program can be updated or stored more easily by simply connecting the wireless communication device 100 to the computer.

Although preferred embodiments of the controller 1, the storage medium, and the wireless communication device 100 of the present disclosure have been described above, the present disclosure is not limited to the above-described embodiment and can be appropriately modified.

For example, in the above embodiment, the storage executing unit 16 uses the control program acquired from the server 300, and updates the control program stored in the control program storage unit 11. However, the present disclosure is not limited thereto. For example, in a state where the control program is not stored in the control program storage unit 11, the storage executing unit 16 may store the acquired control program in the control program storage unit 11.

Furthermore, in the above embodiment, the address generating unit 18 is capable of generating 256×256=65536 types of addresses, and an address serving as an initial setting address of the controller 1 and an address of the server 300 may also be generated. Furthermore, an address may also be generated by excluding addresses that cannot be set. The address generating unit 18 may, for example, generate 65532 numerical values from 2 to 65533 by the hash function.

Furthermore, in the above embodiment, the controller 1 is configured integrally with the industrial machine 200. However, the controller 1 may be configured separately. Furthermore, one controller 1 may also be configured to control a plurality of industrial machines 200.

EXPLANATION OF REFERENCE NUMERALS

1 controller
10 connection terminal
11 control program storage unit
12 identification information storage unit
14 detection unit
15 control program acquiring unit
16 storage executing unit
17 operation changing unit
18 address generating unit
100 wireless communication device
200 industrial machine
300 server

What is claimed is:

1. A controller that includes a connection terminal which can be physically connected to a wireless communication device, and controls an industrial machine, the controller comprising:
    a control program storage unit that stores a control program for controlling an operation of the industrial machine;
    a detection unit that detects whether or not the wireless communication device is connected to the connection terminal;
    a control program acquiring unit that acquires a control program from a remote device via the wireless communication device, the acquired control program to be stored in the control program storage unit;
    a storage executing unit that executes storing of the acquired control program in the control program storage unit; and
    an operation changing unit that allows the control program acquiring unit and the storage executing unit to be operated only when the detection unit detects that the wireless communication device is physically connected to the connection terminal.

2. The controller according to claim 1, further comprising:
    an identification information storage unit that stores identification information unique to a controller; and
    an address generating unit that generates a network address that is set in the wireless communication device on a basis of the identification information,
    wherein the control program acquiring unit acquires the control program from the remote device by using a generated network address.

3. The controller according to claim 2, wherein the address generating unit calculates a hash value unique to a device as identification information, and generates a network address by using a calculated hash value.

4. The controller according to claim 1, wherein the storage executing unit updates, with the acquired control program, a control program that is stored in advance in the control program storage unit.

5. The controller according to claim 1, wherein the wireless communication device is wirelessly connected to the remote device, and receives the control program from the remote device.

6. The controller according to claim 1, wherein the wireless communication device is one of a plurality of wireless communication devices,
    each of the plurality of wireless communication devices is wirelessly connected to the remote device, and
    each of the wireless communication devices receives the control program from the remote device.

7. A non-transitory computer-readable storage medium encoded with a computer-readable program that causes a computer including a connection terminal that can be physically connected to a wireless communication device to operate as a controller which controls an industrial machine, the program causing the computer to operate as:
    a control program storage unit that stores a control program for controlling an operation of the industrial machine;
    a detection unit that detects whether or not the wireless communication device is connected to the connection terminal;
    a control program acquiring unit that acquires a control program from a remote device via the wireless communication device, the acquired control program to be stored in the control program storage unit;
    a storage executing unit that executes storing of the acquired control program in the control program storage unit; and
    an operation changing unit that allows the control program acquiring unit and the storage executing unit to be operated only when the detection unit detects that the wireless communication device is physically connected to the connection terminal.

8. A wireless communication device that stores the program according to claim 7.

9. The non-transitory computer-readable storage medium according to claim 7, wherein the wireless communication device is wirelessly connected to the remote device, and receives the control program from the remote device.

10. The non-transitory computer-readable storage medium according to claim 7, wherein the wireless communication device is one of a plurality of wireless communication devices,
    each of the plurality of wireless communication devices is wirelessly connected to the remote device, and
    each of the wireless communication devices receives the control program from the remote device.

* * * * *